July 23, 1940.    C. A. NERACHER    2,208,643
POWER TRANSMISSION
Filed Oct. 26, 1937    6 Sheets-Sheet 3
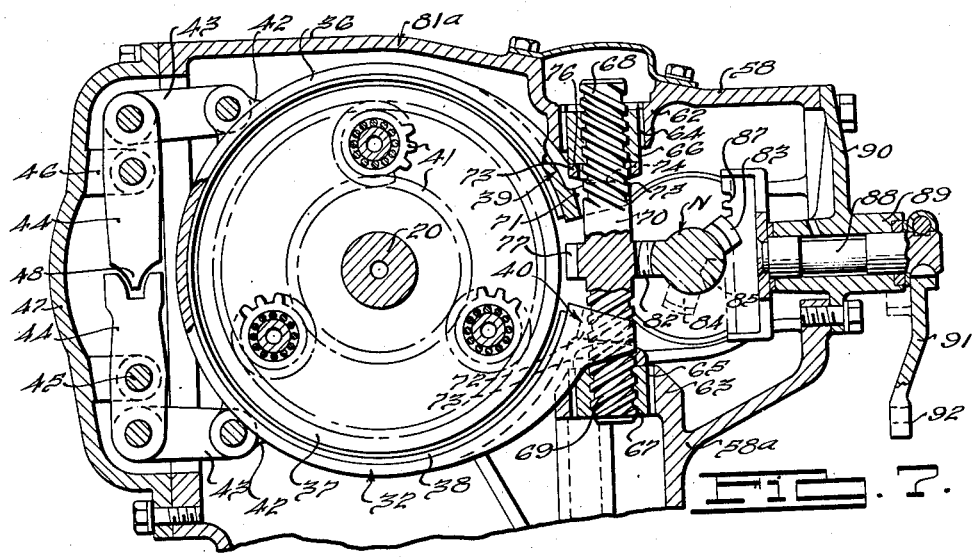
FIG. 7.
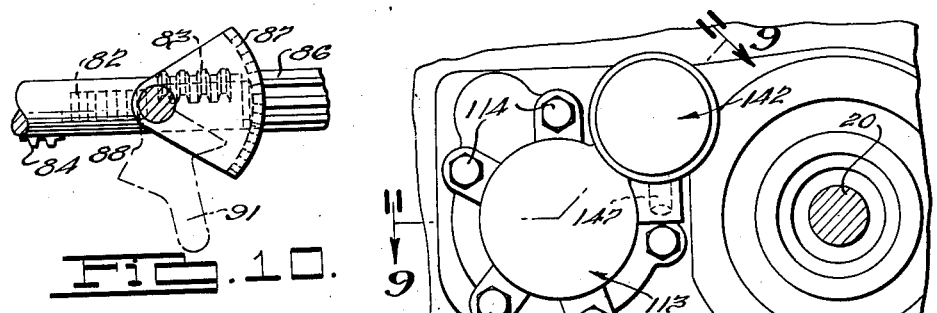
FIG. 10.    FIG. 8.
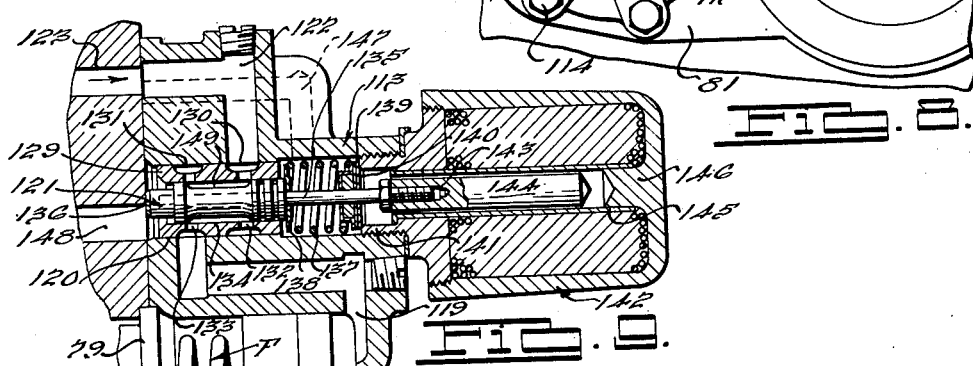
FIG. 9.
Inventor
CARL A. NERACHER
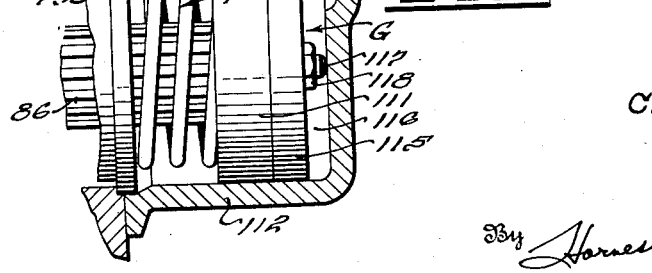
Attorneys.

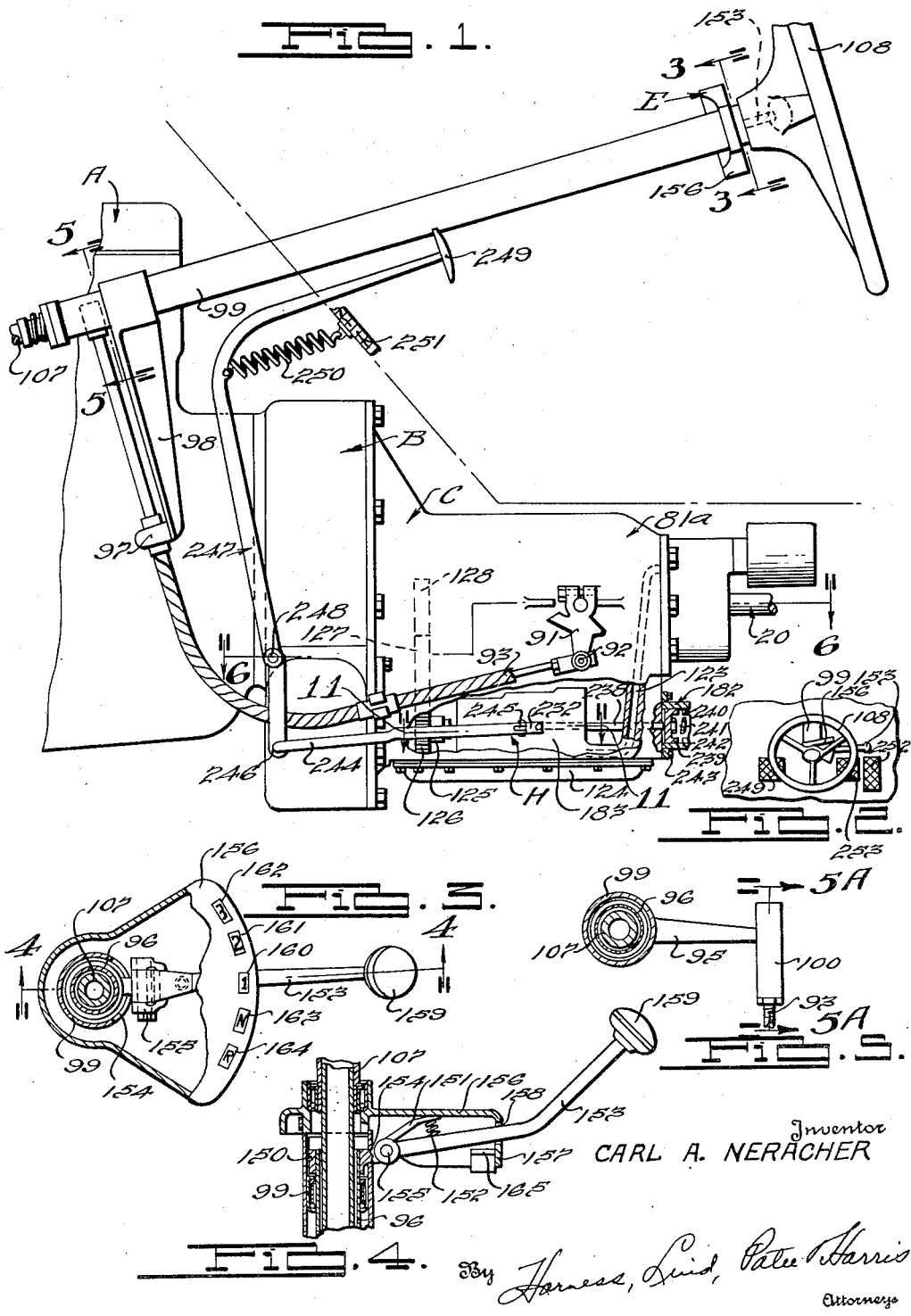

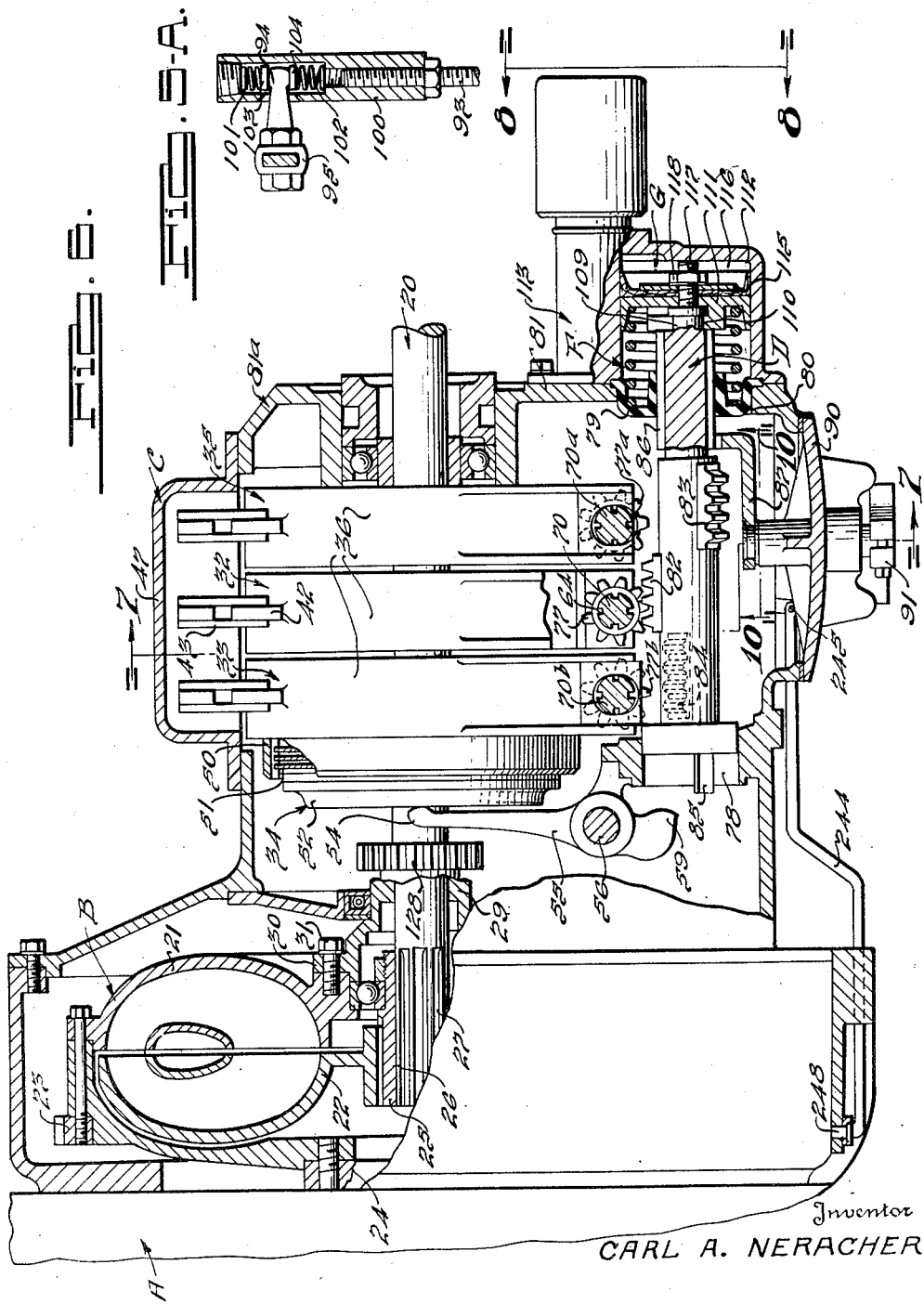

July 23, 1940. C. A. NERACHER 2,208,643
POWER TRANSMISSION
Filed Oct. 26, 1937 6 Sheets-Sheet 4
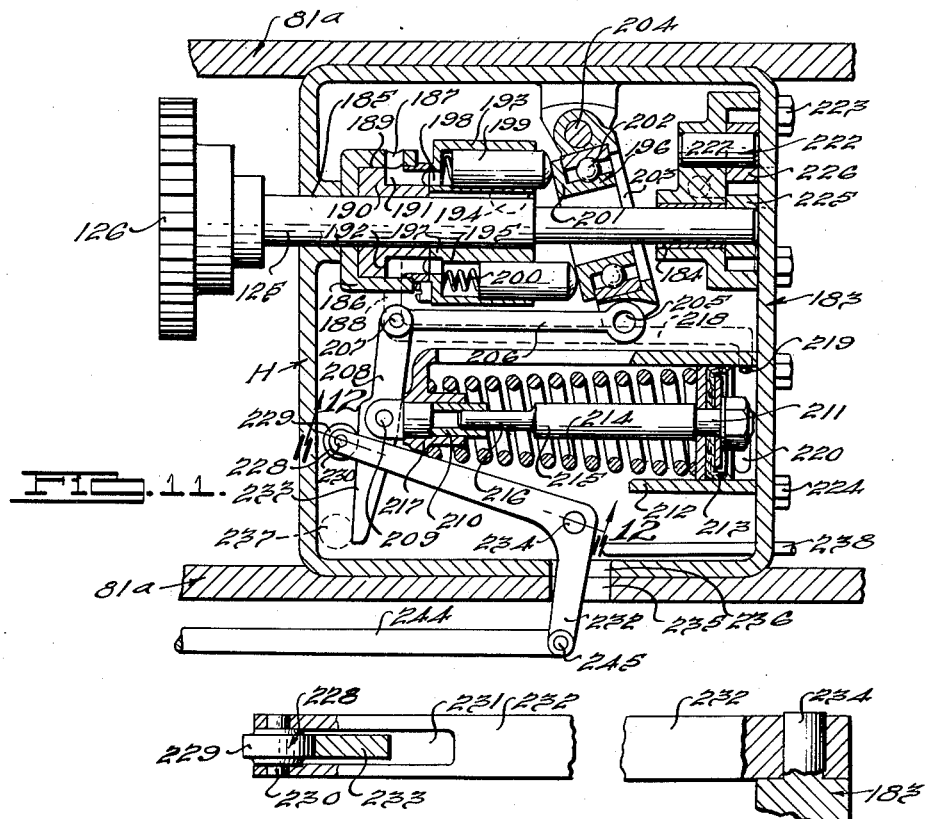
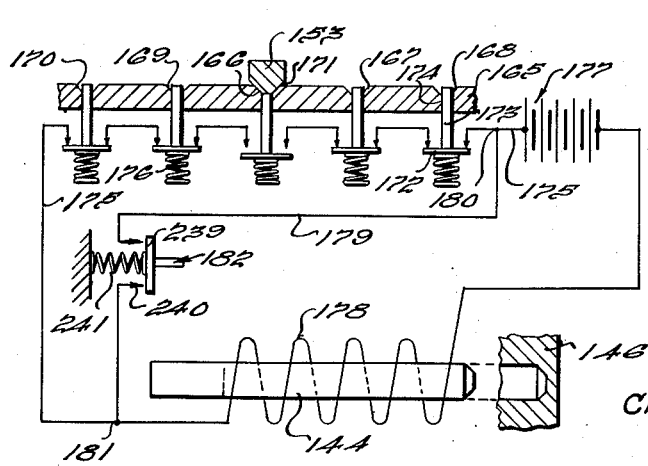
Inventor
CARL A. NERACHER July 23, 1940.  C. A. NERACHER  2,208,643
POWER TRANSMISSION
Filed Oct. 26, 1937   6 Sheets-Sheet 5
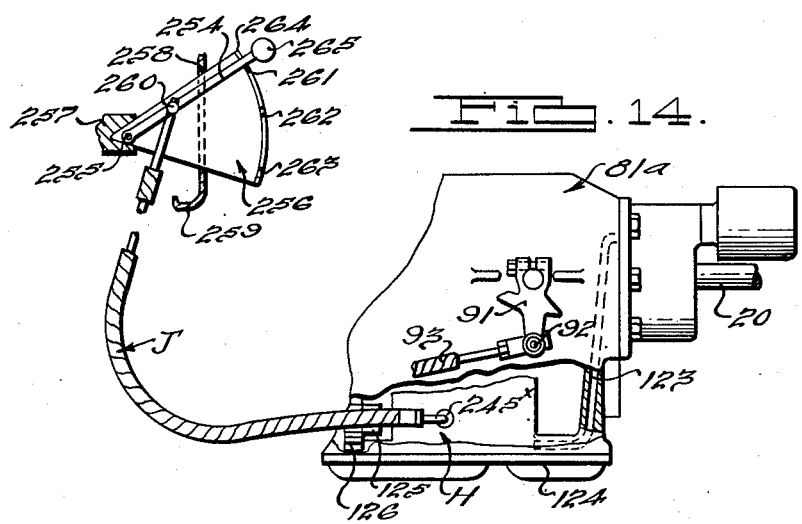
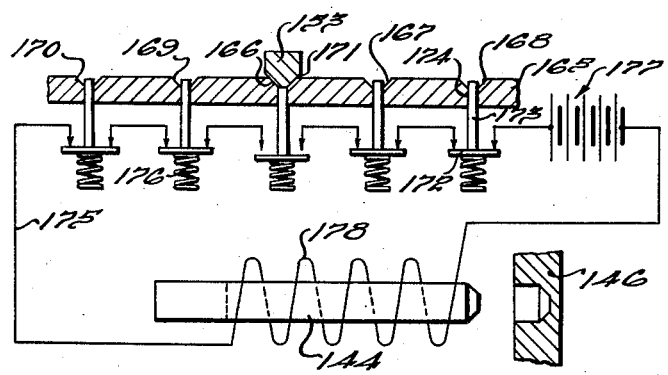
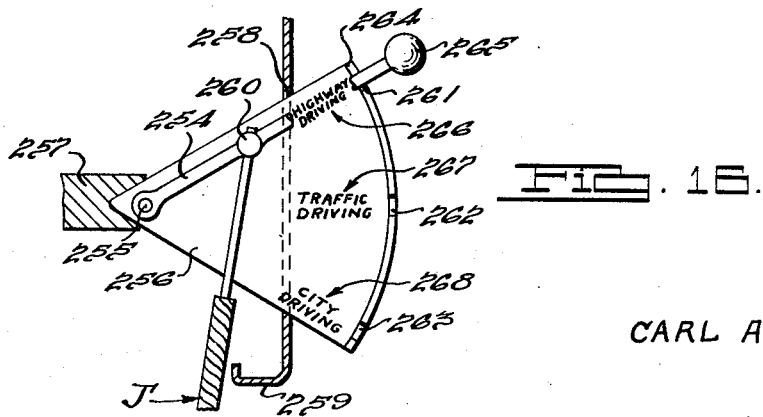
Inventor
CARL A. NERACHER July 23, 1940.　　C. A. NERACHER　　2,208,643
POWER TRANSMISSION
Filed Oct. 26, 1937　　6 Sheets-Sheet 6
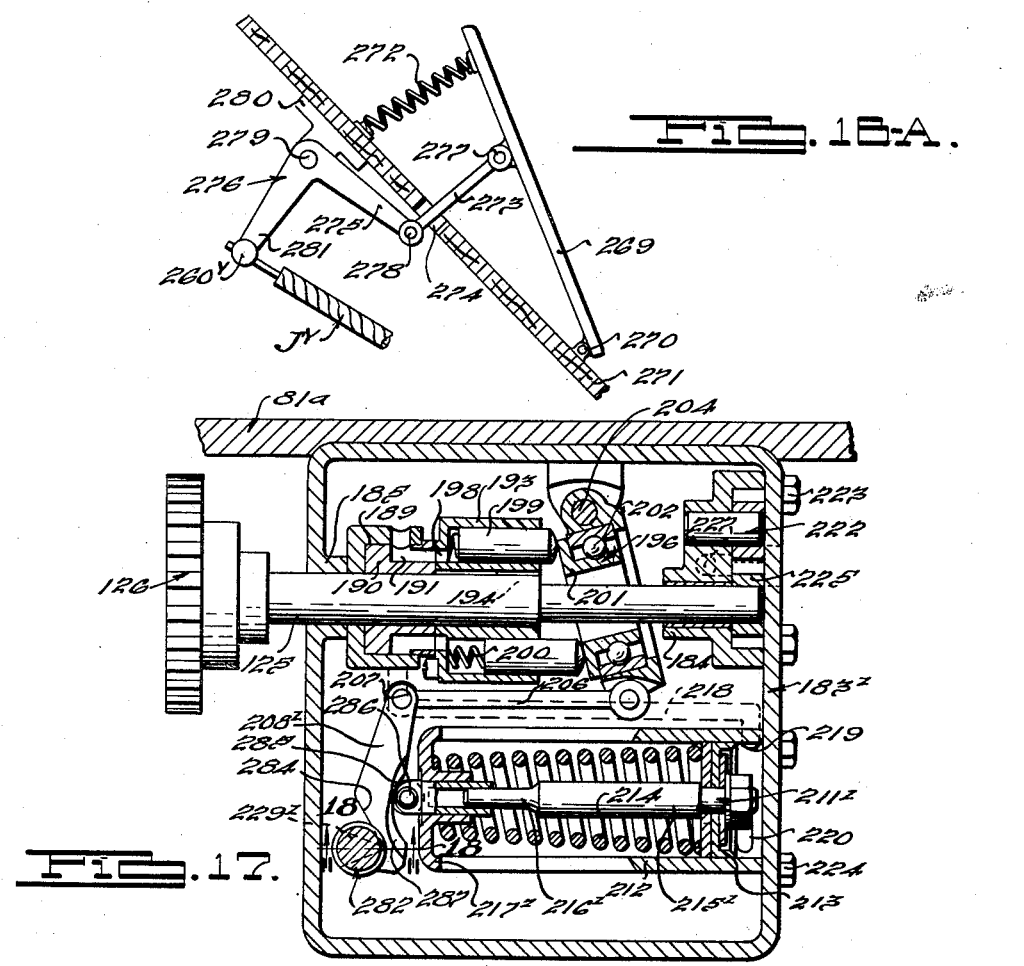
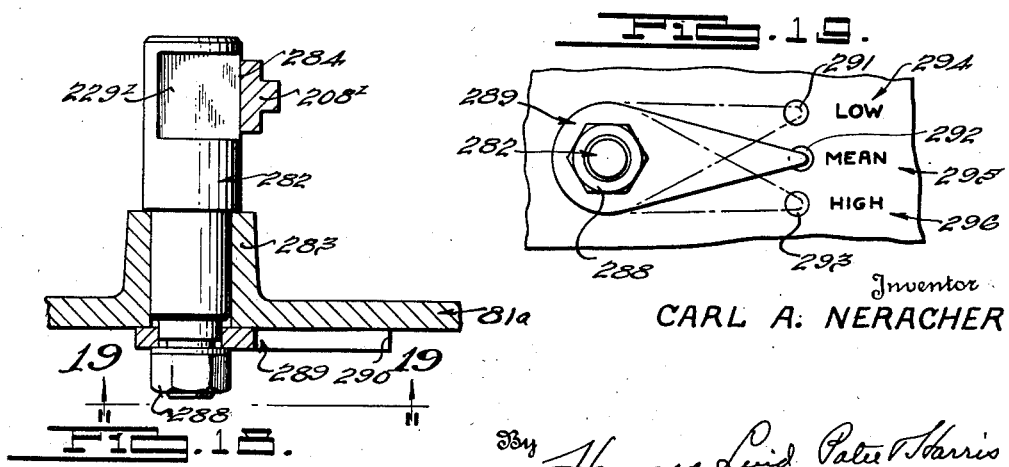
CARL A. NERACHER Patented July 23, 1940

2,208,643

UNITED STATES PATENT OFFICE 2,208,643

POWER TRANSMISSION

Carl A. Neracher, Detroit, Mich., assignor to Chrysler Corporation, Highland Park, Mich., a corporation of Delaware Application October 26, 1937, Serial No. 171,167

25 Claims. (Cl. 74—262)

This invention relates to power transmission mechanism and refers more particularly to improvements in power transmission systems especially adapted for use in connection with motor vehicles, although not necessarily limited thereto.

My invention, in certain more limited aspects, provides improvements in the drive and control for power transmission systems having epicyclic or planetary gear trains. It is customary, with such planetary transmissions, to arrange the gearing to provide for the desired number of speed ratios between the engine and vehicle driving ground wheels and such gearing is customarily selected and controlled to obtain the desired driving speed ratio by actuation of any one of a group of transmission gearing controlling devices usually consisting of reaction brake bands associated with and controlling the rotation of corresponding drums or similar elements of the various gear trains.

One object of my invention resides in the provision of a simple and novel means for controlling the degree of engagement of the speed ratio controlling devices of the transmission, capable of manufacture at relatively low cost.

Another object of my invention, in its more limited aspects, is to provide a variable regulating means whereby the fluid, which actuates the fluid operating means for controlling the brake bands and clutches of the planetary gear trains of a transmission or other corresponding parts of other types of transmissions, is infinitely regulated from a predetermined low to a predetermined high pressure. In the broader aspects of my invention, the fluid pressure is preferably provided by a suitable liquid medium such as oil, but the fluid pressure medium may be air under pressure greater or less than atmospheric pressure.

A further object of my invention resides in the provision of a novel control for my variable regulating means in the form of a pedal which is preferably substituted for the well known clutch pedal for controlling the friction plate clutch in a motor vehicle. It is thereby possible for the vehicle driver to depress this pedal in a manner similar to depressing the well known clutch pedal while changing gears or when it is desirable to release the drive between the engine and the driving ground wheels of the vehicle, during which downward movement of this pedal the pressure of the fluid will be infinitely regulated from a predetermined maximum to a predetermined minimum pressure, at which time a suitable means is provided to release the transmission brake bands and clutches so that these bands and clutches will not operate at exceedingly low pressures which give undesirably high slippage. To assist in giving the layman the same "feel" as he gets with the well known clutch pedal for the friction plate type of clutch, I prefer to provide with my variable regulating means a means whereby when my pedal is being depressed to one-third of its travel, the operating pressure from a suitable swash-plate type pump is infinitely controlled to approximately one-third of its maximum pressure—then, during the other two-thirds movement of the pedal, the pump pressure is very gradually controlled down to approximately one-eighth of its predetermined maximum pressure, at which stage I prefer to incorporate an electrical switch to be contacted to actuate the same solenoid which is used to control the master distributor valve of the planetary transmission of such type as is described and claimed in the co-pending joint application of Carl A. Neracher and Teno Iavelli, Serial No. 53,284, filed December 7, 1935, so as to give complete release of all the bands and clutches.

A still further object of my invention is to provide a plurality of control systems for my variable regulating means, such as a vehicle accelerator pedal control whereby my variable regulating means can be controlled in a manner similar to that of my pedal except that the operation pressure is at a predetermined minimum when the accelerator pedal is in its normal or released position, and is at a predetermined maximum when the accelerator pedal is fully depressed.

Another object of my invention, in its more limited aspects, resides in the provision of a novel and efficient means for readily and conveniently varying the pressure produced by the well known swash-plate pump of such type as is described and claimed in the co-pending application of Augustin J. Syrovy, Serial No. 29,788, filed July 5, 1935, this means including a movable fulcrum acting on the swash plate and permitting the use of a pressure accumulator with this pump.

Further objects and advantages of my invention will be apparent from the following detailed descriptions of several illustrative embodiments of the principles of my invention, reference being had to the accompanying drawings in which:

Fig. 1 is a side elevational view somewhat diagrammatic in form illustrating my power transmission mechanism as a whole.

Fig. 2 is a detail elevational view showing the manually controlled selector element and the well known pedals of a motor vehicle.

Fig. 3 is a sectional view of the manually controlled selecting mechanism taken as indicated by the line 3—3 of Fig. 1.

Fig. 4 is a sectional view along the line 4—4 of Fig. 3.

Fig. 5 is an enlarged sectional elevational view taken approximately as indicated by the line 5—5 of Fig. 1.

Fig. 5—A is an enlarged detail sectional view taken along the line 5A—5A of Fig. 5.

Fig. 6 is an enlarged sectional plan view through the transmission and fluid clutch taken on the line 6—6 of Fig. 1.

Fig. 7 is a sectional elevational view through the transmission, illustrating one of the speed ratio controlling devices and parts associated therewith, the section being taken as indicated by the line 7—7 of Fig. 6.

Fig. 8 is a rear elevational view illustrating the housing mechanism for the fluid pressure operator and associated control valve, the view being taken approximately as indicated by line 8—8 of Fig. 6.

Fig. 9 is a detail sectional elevational view taken along the line 9—9 of Fig. 8.

Fig. 10 is a detail sectional elevational view taken approximately as indicated by the line 10—10 of Fig. 6.

Fig. 11 is a detail sectional plan view of the transmission pump, accumulator and pressure control therefor, the section being taken as indicated by the line 11—11 of Fig. 1.

Fig. 12 is a detail elevational view taken as indicated by the line 12—12 of Fig. 11.

Fig. 13 is a diagrammatic view illustrating the electrical system of control between the manually operated selector element and the fluid pressure control valve mechanism.

Fig. 14 is a partial side elevational view corresponding to Fig. 1 but illustrating a modified arrangement of fluid pressure control system.

Fig. 15 is a wiring diagram for the Fig. 14 arrangement.

Fig. 16 is a detail elevational view of a portion of the Fig. 14 pressure control system showing the legend therefor.

Fig. 16—A is detail elevational view corresponding to Fig. 16 but illustrating a modified arrangement of the remote control for my pressure control system.

Fig. 17 is a detail sectional plan view corresponding to Fig. 11 but illustrating a modified arrangement of the pressure pump control.

Fig. 18 is a detail sectional elevational view taken as indicated by the line 18—18 of Fig. 17.

Fig. 19 is a side elevational view as indicated by the line 19—19 of Fig. 18.

Referring to the drawings, I have illustrated my invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or, low gear, second speed ratio or intermediate gear, third speed ratio or direct drive, and reverse drive. Other speeds may be provided as desired.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resiliency to expand away from contact with the drum when the actuating means is relieved at the flanged ends 39 and 40. In Fig. 7 the low speed ratio braking device 32 is illustrated in the inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, I have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ᵃ are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32. In order to avoid repetition I have not illustrated all of the details of the brake operated means associated with the controlling devices 33 and 35, it being understood that such operating means are similar to that described in connection with the controlling device 32. For convenience of reference the operating shaft or screw for the reverse speed braking device is designated at 70ᵃ and the corresponding shaft for the second speed braking device 33 is designated as 70ᵇ. The gears associated with these screw shafts are respectively designated as 77ᵃ and 77ᵇ. As will be more apparent presently, the gears 77, 77ᵃ and 77ᵇ and lever end 59 are adapted to be selectively operated in order to selectively control the engagement and release of the respective speed ratio controlling devices 32, 35, 33 and 34.

I will next describe the common operating means or selector operating element which is adapted for selective engagement under manual control with the aforesaid screw gears 77, 77ᵃ and 77ᵇ for respectively operating the speed ratio controlling devices 32, 35 and 33; also for operating the direct or third speed controlling device 34; and also for establishing a neutral condition in the transmission.

The transmission casing is adapted to support in a forward opening 78 the reciprocating and oscillating rack or actuating shaft D. The rear bearing for shaft D is provided by a member 79 which is disposed in a suitable opening 80 in the rear end wall 81 of the transmission casing 81ᵃ, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 83, 82 and 84 for respectively operating the screw gears 77, 77ᵃ and 77ᵇ. The forward end of shaft D is further provided with a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progressive rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will furthermore be noted that with the low speed rack 82 in the position illustrated, the remaining racks 83, 84 as well as projection 85 are free from engagement with their respective associated gears 77ª, 77ᵇ, and the lever 55. From Figs. 6 and 7 it will be noted that the shaft D has a space longitudinally and circumferentially between the second speed rack 84 and the direct drive projection 85, this space being designated as the neutral space "N" so that when the shaft is positioned with this space facing the screw gears, each of the racks as well as projection 85 will be free from contact with their associated screw gears and lever 55, and the transmission will be in neutral at which time the various braking devices 32, 33, 34 and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing with a segmental rack 87 rotatably fixed with a shaft 88, best shown in Fig. 7, this shaft being rotatably journalled by a bearing 89 carried by the transmission side cover 90. The shaft 88 has fixed thereto, outwardly of the transmission cover, a lever 91 connected at 92 (see Fig. 1) to a Bowden wire operating mechanism 93.

The Bowden wire operating mechanism 93 extends forwardly for pivotal connection with a ball end 94 of a lever assembly 95 secured to a tubular shaft 96 as shown in Figs. 5 and 5A. The forward end of the Bowden mechanism has a guide 97 provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. I have illustrated this yielding connection in Fig. 5A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journalled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown). The hollow operating shaft 96 extends upwardly to the point preferably just below the steering wheel 108 to the manually controlled device generally designated at E for selectively controlling or manipulating the transmission speed ratios as will be presently more apparent.

Returning now to Fig. 6, the selector rack shaft D has its rear end adjacent the circular rack 86 provided with a groove 109 adapted to receive the flange 110 of the fluid pressure operating piston assembly 111 adapted for reciprocal movement in the cylinder 112 which is a part of a casting 113, best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, I have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in position by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced end 117 of shaft D together with a fastener or nut 118. Fluid, such as oil under pressure, is introduced to the pressure chamber 116 as best shown in Fig. 9, through a passage 11 leading to the valve controlled chamber or cylinder 120 which slidably receives the fluid pressure supply controlling valve 121. The cylinder 120 is supplied with oil under pressure through a passage 122 which receives the oil by a conduit 123 formed in the transmission casing casting. The conduit 123, as best shown in Fig. 1, leads to the delivery side of a swash-plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having annular conduits 130 and 131, respectively, communicating with the passages 122 and 119. The annular passages 130 and 131 are also respectively provided with the inwardly extending ports 132 and 133 adapted for control by the valve 121. This valve has a sliding fit within the cylindrical bore 134 of the porting member 129 and extending axially through the valve with sufficient clearance to prevent binding thereof, is a valve operating rod 135 preferably of brass or other non-magnetic material. The rod 135 extends forwardly of valve 121 and is provided with a stop 136 adapted to limit forwrd movement of valve 121 under the influence of a spring 137 which operates between a valve spring abutment 138 and a rear fixed abutment 139, the latter having associated therewith the fluid pressure sealing washers 140 acting against the threaded stem 141 of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 122. When the valve 121 moves rearwardly under the influence of solenoid 142, as will be presently more apparent, the spring 137 will be compressed and the reduced portion 149 will no longer provide communication between conduits 122 and 119. At such time the conduit 119 will be open through the port 133 to the discharge conduit 148 for returning the oil from the pressure chamber 116 back to the reservoir 124. When the valve 121 moves forwardly under the influence of spring 137, the reduced valve portion 149 affords communication between conduits 122 and 119 to supply fluid pressure from the pump H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillatory adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with its extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment 160, 161, 162, 163 and 164 bearing the legends indicated in Fig. 3 designating the lever positions corresponding to first, second, third, neutral and reverse conditions of control for the transmission.

The flange 157 of housing 156 carries an arcuately arranged switch mechanism below the selector lever 153, this mechanism being best illustrated in the wiring diagram of Fig. 13. This switch comprises an arcuate floor 165 provided with a series of grooves or notches 166, 167, 168, 169 and 170 corresponding respectively to the positions of selector lever 153 when adjusted to the stations 160 to 164, inclusive. The upper sides of the aforesaid notches are preferably chamfered or beveled, as shown in Fig. 13, and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Referring now to the wiring diagram illustrated in Fig. 13, I have provided a plurality of switches or contacts 172 for each of the notches of the switch member 165 and being adapted for operation by a stem 173 slidable in an opening 174 communicating with each of the switch notches so that when the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of wire 175 being connected to the windings 178 of solenoid armature 144 aforesaid, which is grounded at the other terminal of battery 177. A wire 179 is electrically interposed at 180 and 181 between the extremes of wire 175 to be arranged in parallel with wire 175, a single switch 182 being carried by wire 179 to normally break this circuit as illustrated and under such conditions as will hereinafter be more apparent.

My manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate valve 121 to vent the pressure chamber 116, it will be apparent that the fluid pressure load is removed from the shaft D which is now in its rearward position so that arcuate movement of the selector lever 153 will operate through the hollow steering post shaft 107, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjustment of selector lever 153 from a position in one of the notches although any binding tendency experienced at the shaft D during the initial or other tendency to move the shaft will be taken up yieldingly through the Bowden wire connection shown in Fig. 5A.

Referring now to the details of the pump H and my variable pressure regulating means, the pump assembly includes a casing structure 183 adapted to be attached to the transmission structure as illustrated in Figs. 1 and 11. The casing receives the pump drive shaft 125 aforesaid which is journalled at one end in a bearing 184 carried by the casing and suitably supported at the other end in a cylindrical portion 185 of the casing. The shaft 125, as aforesaid, is illustrated with its gear 126 in constant mesh with idler gear 127 which in turn is drivingly connected with the fluid-impeller-associated driving pinion 128. A ported cylindrical member 186 is suitably fixed to the cylindrical portion 185 of casing 183, member 186 having inlet and outlet passages 187 and 188 respectively for the fluid, such as oil, admitted to the pump delivered therefrom under pressure. The inlet 187 is in suitable communication with the fluid in reservoir 124.

Tightly pressed into the cylindrical opening 189 of ported member 186 is a cylindrical port seat body or ring 190 journalling the adjacent end of shaft 125, this body having inlet and outlet passages 191 and 192 communicating radially at one end with passages 187 and 188 respectively. The other ends of the passages 191 and 192 form the well known circumferentially spaced arcuate inlet and outlet ports respectively for communication with the inlet and outlet ports of the pumping cylinders as will presently be apparent.

A pump rotor 193 surrounds shaft 125 for rotation therewith, the rotor being suitably keyed or otherwise fixed at 194 to shaft 125. The rotor 193 has a plurality of circumferentially spaced cylinders 195 opening inwardly toward a wabble or swash-plate 196, the cylinder head portion 197 of the rotor having ports 198 for each cylinder.

Each cylinder 195 slidably receives a piston 199 urged outwardly by a spring 200 into contact with the swash-plate 196, the outer rounded end of each piston yieldingly engaging an outer ring 201 of the swash-plate. This ring is supported by a bearing 202 carried by a swinging arm 203 pivotally supported at 204 from casing 183. At the other side of shaft 125 the arm 203 is pivotally connected at 205 to a forwardly extending link 206 pivoted at 207 to a rocker beam 208. The beam 208 is preferably pivotally supported at 209 to a sleeve member 210 of a pressure accumulator 211 as will presently be apparent.

Slidable in a cylinder 212 is a piston 213 urged inwardly by a relatively heavy spring 214, the piston having an outwardly extending rod 215 with a reduced portion 216 adapted to engage the sleeve member 210 to swing the beam 208 for levelling-off the plate 196 and minimizing or eliminating reciprocation of pistons 199. The sleeve member 210 is adapted for reciprocatory movement within a hollow end member 217 fixed to the casing 183 and serving as a forward stop for the spring 214. Piston 213 moves against spring 214 in response to a predetermined desired pressure of the fluid delivered by the pump, the delivery passage 188 being in communication through a passage 218 with the accumulator cylinder 212 at a discharge 219. The fluid under pressure is led to a suitable point of usage from cylinder 212 through a casing passage 220. The rearward wall of the casing 183 closes off the inner end of cylinder 212 and the chamber of auxiliary pump 222 where such pump is employed. Suitable means may be employed to fix the auxiliary pump 222 and the cylinder 212 to casing 183, such as bolts or fasteners 223 and 224 respectively.

The auxiliary pump 222 comprises a driving gear 225 and a driven gear 226 together with oil inlet 227 communicating with an oil reservoir and is adapted to supply oil under a relatively low pressure to lubricate parts of the engine A or transmission C.

As the shaft 125 drives rotor 193, with plate 196 positioned as in Fig. 11 for maximum stroke, approximately half of the pistons 199 are moving inwardly drawing in oil through their inlet port and ports 198 associated therewith, while the remaining pistons are discharging oil under pressure through their associated ports 198 and outlet port for passage to cylinder 212 in the well known manner.

When the pump is initially operated, the pressure of the oil delivered at 219 to cylinder 212 rapidly builds up to the desired amount, say 400 pounds per square inch for example, and as this pressure is nearly reached (determined by the value of spring 214 and the position of my movable fulcrum 228, as will presently be more apparent) the piston 213 moves outwardly to increase the capacity of cylinder 212 and moves the reduced portion 216 of rod 215 into contact with the closed end of the hollow sleeve 210. Continued movement swings the rocker beam 208 and thereby swings plate 196 about its pivot 204 into a position approximately transverse to the axis of shaft 125. This levelling-off of plate 196 progressively lessens the stroke of pistons 199 until they are substantially motionless so far as reciprocation is concerned, assuming, of course, that oil under pressure is not being relieved from the delivery system. Any minor leakages which may be present in the delivery system will require only a small movement of the pistons to maintain the maximum desired oil pressure in cylinder 212.

By normally spacing the reduced portion 216 of rod 215 from the closed end of the hollow sleeve 210, there is provided a lost motion connection between the swash-plate structure 196 and the control therefor and the swash-plate does not begin to level off as soon as piston 213 begins to move accompanied by further compression of spring 214 so that the maximum stroke of the pistons 19 is realized longer than otherwise. In this manner the predetermined maximum pump pressure is rapidly attained. The plate 196 is, of course, free to assume any position intermediate its inclined position of Fig. 11 and its fully levelled-off position under control of rod 215 according to the demand placed on the delivery system. It will therefore be understood that while the swash-plate 196 is normally swingable about its pivotal mounting in response to actuation of the control therefor, including the rod 215, the plate is free from such movement and is not actuated when the control member is operated in opposite directions respectively by the fluid pressure within the cylinder 212 and the spring 214 in taking up and establishing the lost section connection between the rocker beam 208 and the control therefor.

The accumulator cylinder 212 stores oil under pressure so that when oil is delivered under pressure at passage 220, the spring 214 expands and tends to prevent an otherwise rapid fall of the fluid pressure.

The movable fulcrum 228 of my variable pump pressure regulating means includes a rotatable cylinder or roller 229 (best shown in Figs. 11 and 12) suitably journalled as by the pin 230 within a slotted portion 231 of a bellcrank 232. The roller 229 is adapted to be selectively moved by the vehicle driver to any station on a ramped extension 233 of the rocker beam 208 by actuation of the other end of the bellcrank 232, a suitable pivot 234 on casing 183 being provided for the bellcrank in order that rearward movement of the crank within aligned slots 235 and 236 in casings 81ᵃ and 183 respectively will cause the roller 229 to evenly climb the ramped extension 233. It is obviously evident that with the roller 229 in its illustrated maximum-pressure position, the reduced portion 216 of rod 215 must act with the maximum pressure required by this control to level off the plate 196, inasmuch as the movable fulcrum or roller 229 is stationed immediately adjacent the path of the rod 215 and sleeve 210 so that there is practically no moment arm between the opposed forces of the roller 229 and the sleeve 210 acting upon the rocker beam 208 and substantially at right angles thereto.

As the roller 229 is moved toward its extreme or minimum-pressure position, generally indicated at 237, the movement arm between the opposed forces of the roller 229 and the sleeve 210 acting upon the rocker beam 208 becomes gradually greater until the roller 229 is at its extreme station 237 at which time the movement of the bellcrank 232 is checked by the rearward extremes of the slots 235 and 236. With this gradual increase in moment arm the pressure within the cylinder 212 acting on the piston 213 becomes less and less due to the fact that less pressure is required by rod 215 and sleeve 210 to cause the beam 208 to level off the swash-plate 196. Thus, it is evident that the relationship of the predetermined full distance of travel of the roller 229 will effect a predetermined minimum fluid pressure, the aforesaid predetermined maximum fluid pressure—with the roller 229 positioned as illustrated—being dependent upon the force exerted by the spring 214. I prefer to use a minimum fluid pressure which is about one-eighth of my predetermined maximum for reasons as will hereinafter be more apparent.

A stem 238 may, if desired, be positioned within aligned openings in casings 81ᵃ and 183 for reciprocatory action. The rearward end of the stem 238 has fixed thereto an electrical switch contact 239 of switch 182 (see Fig. 1) which is normally separated from a cooperating electrical contact 240 by a suitable spring 241 interposed therebetween within a switch housing 242 therefor being fixed to casing 81ᵃ by bolts 243. The forward end of stem 238 is positioned so that during the rearward movement of the bellcrank 232, the stem will be moved rearwardly by the bellcrank just before striking the extremes of slots 235 and 236—the contacts 239 and 240 thereby being electrically connected.

In the Fig. 13, electrical diagram it will be noted that when the contacts 239 and 240 of switch 182 are electrically connected, a circuit is completed through wire 179 between the wire 175 and the solenoid windings 178. Thus, it is evident that the closing of switch 182 will cause the solenoid armature 144 to move rearwardly to abutment 146 even though one of the switches 172 is open to break the circuit through wire 175. This rearward movement of armature 144 would also be effected when the switch 182 is closed although all the switches 172 are closed at that time by reason of the vehicle driver lifting the selector lever 153 to select another speed ratio. The rearward movement of armature 144 aforesaid opens the conduit 119, through the port 133, to the discharge conduit 148 for returning the oil from the pressure chamber 116 back to the reservoir 124. This movement effects a complete release or neutral position for each of the controlling devices 32, 33, 34 and 35 so that no drive is transmitted to the power take-off shaft 20. Upon forward movement of the bellcrank 232 the contacts 239 and 240 are immediately urged apart by spring 241 to break the electrical circuit through wire 179, and the armature 144 moves back to its illustrated position of Fig. 9 under the influence of spring 137, the reduced valve portion 149 again affording communication between conduits 122 and 119 to supply fluid pressure from the pump H to operate the piston 111 and rack D forwardly for actuating one of the speed ratio controlling devices 32, 33, 34 and 35.

I have provided a novel control for my variable pump pressure regulating means which may be used therewith, if desired. A movement transmitting member 244 (best shown in Figs. 1, 6 and 11) is pivotally connected at 245 to the arm of the bellcrank 232 outside of casing 81ª. The forward end of the member 244 is pivotally connected at 246 (see Fig. 1) to the shorter arm of a pedal 247 pivoted at 248 to a suitable stationary support member of the clutch B. By depressing the face 249 of pedal 247, movement is transmitted through the member 244 to the bellcrank until the bellcrank strikes the extremes of the slots 235 and 236, a resilient means such as spring 250 fixed to the pedal 249 and the vehicle toe-boards 251 tending to return the pedal face 249 to its illustrated position. The relationship of the shorter arm to the longer arm of pedal 249 can be so determined, if desired, that as the pedal face 249 is depressed to substantially one-third of its complete movement, the lower arm of pedal 249 will move rearwardly in an arc to transmit sufficient rearward movement to member 244 for causing the bellcrank 232 to move roller 229 sufficiently from its illustrated station to reduce the pump pressure to about two-thirds of its maximum pressure by reducing the force required at the sleeve 210 to level off the swash-plate 196 as was described earlier. Now, when the pedal face 249 is fully depressed, the member 244 will cause the bellcrank 232 to move the roller 229 to its extreme position of 237 at which time the pump pressure will be reduced to about one-eighth of its maximum pressure by lessening still further the force required at the sleeve 210 to level off the swash-plate 196.

At the extreme end of the movement of pedal face 249, the bell-crank moves the stem 238 rearwardly to close the switch 182 and thereby actuate the solenoid armature 144 to release the controlling devices 32, 33, 34 and 35.

One feature of my invention resides in the simple control which is possible by my novel transmission system, one preferred embodiment of this control being illustrated in Fig. 2 wherein it will be observed that the selector lever 153 is positioned for manipulation laterally to the right of the steering wheel 108 for effecting a change in the condition of the transmission. My transmission provides for convenient manipulation of the motor vehicle by providing the engine throttle control or accelerator pedal 252 preferably at the right hand side of the steering post 99 so that it may be manipulated by the right foot of the driver. On the same side of the steering post is a pedal 253 which is adapted for operating the wheel brakes of the motor vehicle, and on the other side I have provided the pedal face 249 for convenient manipulation by the left foot of the vehicle driver. The pedal face 249 is thus apparently the well known friction plate clutch pedal, and has the same "feel" when operated by the driver, as will presently be more apparent.

As the pedal face 249 is depressed to about one-third of its maximum movement, the roller 229 is moved to decrease the fluid pressure to approximately one-third of the predetermined maximum pressure, the speed ratio controlling device 32, 33, 34 or 35 selected by the vehicle driver will be operated by less and less pressure in chamber 116—resulting in more and more slippage of the drum 37. Completion of the movement of pedal face 249 moves the roller 229 to its extreme position 237 and very gradually decreases the fluid pressure to about one-eighth of the predetermined pressure, the selected controlling device 32, 33, 34 or 35 being operated by less and less pressure in chamber 116 until there is just sufficient pressure to prevent the drum 37 from slipping undesirably. At the extreme of the pedal movement the rod 238 is moved rearwardly to close the switch 182 and move the solenoid armature 144 rearwardly to completely release all the controlling devices 32, 33, 34 and 35.

On the return movement of pedal 247, assisted by spring 250, the contacts 239 and 240 are disconnected by spring 241 immediately to return the armature 144 as earlier described, and the fluid pressure is controlled in a manner just the reverse of the downward pedal movement, until the pedal is again in its illustrated position at which time the fluid pressure is once more at the predetermined maximum.

It is obviously evident that the slippage of the drum 37 is very gradual as the pedal face 249 is depressed. Furthermore, the relationship of the short arm to the long arm of pedal 247 is such that two-thirds of the maximum fluid pressure is reduced while the pedal face 249 travels about one-third of its total movement, and that the fluid pressure is further gradually reduced to about one-eighth of its predetermined maximum as the pedal movement is completed, at which time the switch 182 is closed to give a neutral position for the transmission C. Thereby the driver always effects a smooth and quiet speed ratio change, inasmuch as the slippage of the selected controlling device is desirably high until the pedal face 249 is nearly at its illustrated position of Fig. 1.

Attention is directed to the fact that the vehicle driver does not necessarily have to fully depress the pedal face 249 while selecting a speed ratio. For example, he may depress the pedal face to a predetermined distance to effect a predetermined amount of slippage of the selected controlling device, depending on the kind of vehicle performance he desires. On the other hand, it is not necessary for the driver to depress the pedal face at all while selecting a speed ratio, for the fluid clutch B will absorb to a great extent any harsh action resulting from such a power shift.

It is not my intention to limit my invention to the degrees of fluid pressure control herein described, since these are for illustrative purposes only, and the switch 182 can be eliminated if desired.

With reference to the operation of my power transmission, the selector operation mechanism is practically instantaneous in its response to selective adjustment of the lever 153 and the different selections may be made as rapidly as desired. In the general operation of the selector mechanism E for changing the transmission speed ratio, the operator depresses the pedal face 249 if he desires a soft quiet speed ratio change at that instant, and moves the selector lever from one of the station notches in the switch member 165. Just as soon as the selector lever is moved from one of the notches, the switch 172 associated with such notch will be closed, thereby inducing an electrical circuit through the wire 175 to the solenoid windings 178 for causing the solenoid armature 144 to move rearwardly. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. The selector lever 153 may then be moved into any other station of control and dropped into the corresponding notch for such position.

When the selector lever is so released, it will be apparent that one of the switches 172 corresponding to such newly selected position will be opened—thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating shaft D without causing any movement of any of the speed ratio controlling devices in the event that neutral was selected.

Referring now to the modified embodiment illusstrated in Figs. 14 to 16, I have provided an arrangement incorporating a novel dash control for my variable pump pressure regulating means. It will be understood that this modified arrangement is intended to be substituted for the corresponding parts previously described and the entire mechanism and the operation of the same will not again be duplicated.

Attention is directed to the fact that the stem 238 and the switch 182 of Fig. 1 have been omitted in the Fig. 14 embodiment. The forward end of the Bowden wire mechanism J extends forwardly from its pivotal connection 245× with crank 232 for attachment to a suitable remote control. I prefer to illustrate my invention with a dash control, although my invention is not necessarily limited to this type of control, the control comprising a selector arm or lever 254 pivotally connected at 255 to a sector plate 256 suitably fixed to a stationary member 257 and protruding through a slot 258 in the vehicle dash 259. The Bowden wire is pivotally connected at 260 to the middle portion of lever 254, the lever having sufficient resilience to be continuously urged toward a series of arcuate notches—in this instance, three in number—261, 262 and 263 carried by a flange portion 264 of the plate 256. Thereby the vehicle driver may move the knob or handle 265 of the lever 254 to selectively engage the lever with one of these arcuate notches to transmit this movement to the bell-crank 232.

These notches 261, 262 and 263 are preferably so arranged on the sector flange 264 that the various adjustments of lever 254 therein will move the bell-crank 232 rearwardly to position the movable fulcrum 228 for providing a desired fluid pressure with which to operate the various speed ratio controlling devices 32, 33, 34 and 35 with a predetermined amount of slippage.

It will be noted that in Fig. 15 the wire 179 and switch 182 of Fig. 13 are omitted, the other members of this wiring diagram and their function being identical to those of Fig. 13.

In Fig. 16 I have shown, for the purpose of illustration only, the selector mechanism of Fig. 14 having suitable legends 266, 267 and 268 on plate 256 adjacent the notches 261, 262 and 263 respectively. These notches are preferably arcuately spaced and identified as illustrated in order to provide the predetermined maximum fluid pressure when the lever 254 registers with the "Highway driving" notch 261—at which time the bell-crank 232 is in its Fig. 11 position. It is obviously evident that little slippage of the controlling devices 32 to 35 is desirable for highway driving when rapid acceleration and power shifting is usually highly desired.

For the "Traffic driving" notch 262 stage it is desirable to have about three-fourths of the predetermined maximum fluid pressure to allow the controlling devices to slip a predetermined amount. In other words, the bell-crank 232 must be moved rearwardly sufficiently to position the movable fulcrum 228 so as to produce a reduction in the fluid pressure. This desirable slippage allows the driver to select the various speed ratios of the transmission with little or no jar and without undue delay in accelerating the vehicle while driving in medium traffic.

When the lever 254 engages the "City driving" notch 263, the predetermined maximum fluid pressure is preferably reduced about half, the movement imparted by the Bowden wire J to bell-crank 232 being sufficient to swing the movable fulcrum 228 to a station wherein the maximum fluid pressure is halved. This further reduction in fluid pressure allows the controlling devices 32 to 35 to slip still more so that the driver can be assured of a smooth even change of speed ratios and acceleration while driving in heavy traffic. It also permits the driver to select a high speed ratio such as second or direct drive and to remain in that speed ratio while starting and stopping the vehicle in congested traffic, this increased desirable slippage of the controlling devices permitting this simplification in controlling the vehicle and reducing the necessary effort of the driver in operating the vehicle.

In the operation of this embodiment of my invention, the vehicle driver grasps the handle 265 and moves the lever 254 into the notch corresponding to the vehicle performance he desires, and then may leave the lever 254 in the selected adjustment until he chooses to make another adjustment. During this time he may select the various speed ratios of the transmission and effect through the selected adjustment of lever 254 the desired amount of slippage of the speed ratio controlling devices 32 to 35.

Referring now to Fig. 16—A in which I have illustrated another embodiment of my invention in the nature of a novel vehicle accelerator pedal control for my variable pump pressure regulating means, it is to be understood that this modified arrangement is intended to be substituted for the corresponding parts previously described, and I have indicated parts of similar function but different construction by primed "y" reference characters.

An accelerator pedal 269 is pivotally connected at 270 to the vehicle toe boards 271, a suitable spring 272 being interposed therebetween to resiliently maintain the pedal in its illustrated normal position. This pedal is adapted to actuate the throttle linkage of the vehicle prime mover, such as an internal combustion engine (not shown) and also my pressure regulating means.
A rod 273 moves within a slot 274 in the toe boards 271 and connects the accelerator pedal and an arm 275 of a bell crank 276 by pivotal connections 277 and 278 respectively. The bell crank is pivotally connected at 279 to a bracket 280 fixed to the toe boards 271. The other arm 281 of the bell-crank has fixed thereto at 260$^y$ the Bowden wire J$^y$ and is adapted to be moved forwardly to carry the Bowden wire with it.

The Bowden wire is of sufficient length so that when the accelerator pedal is in its normal position the bell-crank 232 will be moved rearwardly sufficiently from its Fig. 11 station to cause the movable fulcrum 228 to provide a reduced pressure—preferably about one-half of the predetermined maximum fluid pressure. Then, as the accelerator pedal is depressed, the bell-crank 232 will evenly move forwardly until the pedal is about completely depressed at which instant the roller 229 of the movable fulcrum 228 will be in its Fig. 11 position wherein the predetermined maximum fluid pressure is attained.

In the operation of this embodiment of my invention the vehicle driver depresses the accelerator pedal a definite amount to effect an acceleration after selecting a speed ratio or in accelerating the vehicle without making a speed ratio change. When the pedal 269 moves, the movable fulcrum 228 moves also to provide a gradual increase in fluid pressure and thus effect a gradual decrease in slippage of the selected speed ratio controlling device. It is thereby possible for the vehicle driver to obtain desirable slippage at low motor speeds and smooth selection of speed ratios—additional depressing of the accelerator pedal producing a gradual reduction in controlling-device slippage and effecting improved and faster acceleration. The desirable relatively high slippage of the controlling devices at low engine speeds also overcomes to a great extent the inherent characteristic of the well known fluid coupling of causing the vehicle to creep while it is desirable to have the vehicle stationary. While I have illustrated and described a typical fuel feed accelerator pedal for controlling the pump pressure regulating means, it will be understood that other types of fuel feed control devices may be employed within the broad aspects of my invention.

In Figs. 17 to 19 I have provided still another embodiment of my invention including a control for my variable pump pressure regulating means which is preferably manually controlled as illustrated. I have indicated parts of similar function but different construction by reference characters primed "z"—it being understood that this modified arrangement is intended to be substituted for the corresponding parts previously described.

Attention is directed to the fact that the pedal 241, as well as the stem 238 and switch 182, have been omitted. As a substitute for the movable fulcrum 228 I have provided a rotatable shaft 282 suitably journalled in a cylindrical flange 283 of the casing 81$^a$. Formed on the upper end of shaft 282 is a knife-edge 229$^z$ (best shown in Figs. 17 and 18) which is adapted to act at right angles to the rearmost portion of a cam surface 284 of the forward face of the rocker beam 208$^z$. The stem portion 216$^z$ of rod 215$^z$ has a roller 285 mounted thereon at 286 which is adapted for rotation along a tracked recess 287 of the rearward face of the rocker beam 208$^z$.

The reduced portion of shaft 282 protruding through the casing 81$^a$ receives a suitable locking means such as a threaded nut 288. If desired, an indicator member 289 may be suitably locked to shaft 282 and adapted to be positioned between the casing 81$^a$ and nut 288.

The indicating portion 290 of member 289 is thus adapted to be swung in an arc with nut 288 for selective positioning with a series of arcuately arranged stations—in this instance three—291, 292 and 293. I have shown for the purpose of illustrating my invention suggestive legends 294, 295 and 296 for the stations 291, 292 and 293 respectively.

When the indicator member 289 is positioned adjacent the station 292, the knife-edge 229$^z$ is in contact with the rearmost portion of the cam surface 284. This rearmost portion is located at a sufficient distance from the pivotal connection 207 to cause the roller 285 to be forced against the tracked recess 287 by a predetermined reduced fluid pressure in cylinder 212 to thereby level off the swash-plate 196. It is desirable to have this predetermined reduced fluid pressure sufficient to cause the speed ratio controlling devices 32 to 35 to slip sufficiently so that the vehicle driver may be assured of fairly smooth speed ratio changes and yet have reasonably fast acceleration. I have found it desirable to have predetermined medium reduced pressure of about four-fifths of the predetermined maximum fluid pressure.

It is possible to secure even a further reduced fluid pressure by adjusting the nut 288 and shaft 282 in a clockwise direction as viewed in Fig. 17 until the indicating portion 290 is at station 291. This rotational movement will cause the knife-edge 229$^z$ to force its way up the lower inclined portion of the cam surface 284, toward the adjacent end of rocker beam 208$^z$ sufficiently to effect a levelling-off of the swash-plate 196 at the aforesaid still lower pressure. It is obviously evident that when the indicating portion 290 is adjacent the "low" station 291, the point at which the knife-edge 229$^z$ contacts the cam surface 284 will be further away from the point of contact between roller 285 and tracked recess 287 than in its Fig. 17 position. In other words, a greater moment arm has been effected by moving the fulcrum or knife-edge 229$^z$ so that less fluid pressure within cylinder 212 is required to force the roller 285 against the rocker beam 208$^z$ to level off the swash-plate. The said "low" fluid pressure is preferably sufficient to cause the speed ratio controlling devices 32 to 35 to slip sufficiently to effect a very soft engagement when the various speed ratios are selected by the vehicle driver. Furthermore, this desirable fluid pressure permits the driver to stop and start his vehicle in the higher speed ratios such as second and direct speed, resulting in less fatigue to the driver. For my own purposes, I have found it desirable to use a "low" pressure of about three-fifths of the predetermined maximum pressure.

By rotating the shaft 282 in a counterclockwise direction as viewed in Fig. 17 until the indicating portion 290 is positioned at the "high" station 293, the knife-edge 229$^z$ forces its way along the upper inclined portion of the cam surface 284 sufficiently to cause the swash-plate 196 to level off substantially at the predetermined maximum fluid pressure. When the indicating portion 290 is at the "high" station 293, the point at which the knife-edge 229ˣ contacts the cam surface 284 will be closer to the point of contact between roller 285 and tracked recess 287 than in its position of Fig. 17. That is to say, a lesser moment arm is created by moving the fulcrum or knife-edge 229ˣ so that a greater fluid pressure within cylinder 212 is required within cylinder 212 to force the roller 285 against the rocker beam 208ˣ to effect the levelling off of the swash-plate. This "high" pressure is preferably sufficient to prevent the speed ratio controlling devices from slipping undesirably when "stunt driving" or "power shifting," with the motor racing, is desired by the vehicle driver while selecting the various speed ratios. In this instance the selecting of the speed ratios will be quite harsh, and objectionable to most vehicle drivers except those who desire this spectacular performance.

In the operation of this embodiment of my invention, the vehicle driver adjusts the nut 288 under the transmission casing 81ᵃ to position the indicating portion 290 at the station 291, 292 or 293 depending on the vehicle performance desired by reason of the controlled slippage of the speed ratio controlling devices, as previously described. Then the driver is assured of this performance when he selects the various speed ratios of the transmission, until such time as it is the driver's pleasure to change the adjustment nut 288.

Various modifications and changes will be apparent from the teachings of my invention, as set forth in the appended claims, and it is not my intention to limit my invention to the particular details of construction and operation shown and described for illustrative purposes.

What I claim is:

1. In a motor vehicle transmission having a plurality of speed ratio controlling devices, fluid pressure operated means for selectively operating said devices, means including a pump for supplying a fluid under operating pressure to said pressure operated means, mechanism responsive to the pressure of fluid delivered by said supply means for controlling the pressure of the fluid delivered by said pump, and means for varying the action of said mechanism for regulating the fluid delivery output by said pump.

2. In a motor vehicle transmission having a plurality of speed ratio controlling devices, fluid pressure operated means for selectively operating said devices, means including a pump for supplying fluid pressure to said pressure operated means, mechanism responsive to the pressure of fluid delivered by said supply means for controlling the pressure of the fluid delivered by said pump, and driver operable means for adjustably conditioning said mechanism for predetermining the maximum fluid delivery output by said pump.

3. In a motor vehicle transmission having a plurality of speed ratio controlling devices, fluid pressure operated means for selectively operating said devices, means for supplying fluid pressure to said pressure operated means, mechanism responsive to the pressure of fluid delivered by said supply means for controlling the pressure of the fluid delivered by the latter, and manually operable selector actuated means for selectively varying the action of said mechanism for regulating the pressure of fluid delivered by said supply means.

4. In a motor vehicle transmission having a plurality of speed ratio controlling devices, fluid pressure operated means for selectively operating said devices, means for supplying fluid under pressure to said fluid pressure operated means, mechanism for controlling the fluid pressure delivered by said supply means, and a remote control including manually operable selector actuated means for selectively varying the action of said mechanism for regulating the pressure of fluid delivered by said supply means.

5. In a motor vehicle transmission having a plurality of speed ratio controlling devices, fluid pressure operated means for selectively operating said devices, means for supplying fluid pressure to said fluid operated means, control mechanism for said fluid supply means, said mechanism comprising means adapted for movement in response to pressure of fluid delivered by said supply means, a lever operable by said pressure movable means, and variable means for providing a fulcrum for said lever at diverse distances from the point of application of force thereto by said pressure movable means for regulating the pressure of fluid delivered by said supply means.

6. In a motor vehicle transmission having a plurality of speed ratio controlling devices, fluid pressure operated means for selectively operating said devices, means for supplying fluid pressure to said fluid operated means, control mechanism for said fluid supply means, said mechanism comprising means adapted for movement in response to pressure of fluid delivered by said supply means, a lever operable by said pressure movable means, variable means for providing a fulcrum for said lever at diverse distances from the point of application of force thereto by said pressure movable means, and manually operable selector means for selectively positioning said fulcrum for regulating the pressure of fluid delivered by said pump.

7. In a motor vehicle transmission having a plurality of speed ratio controlling devices, fluid pressure operated means for selectively operating said devices, pump means for supplying fluid under pressure to said fluid pressure operated means, said pump means including a member having a plurality of cylinders, a pumping piston reciprocating in each of said cylinders, a wabble plate structure controlling movement of said pistons, control means for said wabble plate structure comprising an accumulator cylinder adapted to receive fluid under pressure from said pump, an accumulator piston in said accumulator cylinder, yielding means acting on said piston in opposition to movement thereof induced by fluid pressure, a piston rod operably connected to said accumulator piston, a lever disposed in the path of movement of said piston rod for movement thereby, said lever having an operable connection with said wabble plate structure, and variable means for providing a fulcrum for said lever at diverse distances from the point of application of force thereto by said piston rod.

8. In a motor vehicle transmission having a plurality of speed ratio controlling devices, fluid pressure operated means for selectively operating said devices, pump means for supplying fluid under pressure to said fluid pressure operated means, said pump means including a member having a plurality of cylinders, a pumping piston reciprocating in each of said cylinders, a wabble plate structure controlling movement of said pistons, control mechanism for said wabble plate structure including a member adapted for movement in response to pressure of the fluid delivered by said cylinders, a lever acting in opposition to said member, said lever having an operable connection with said wabble plate structure, and variable means for providing a fulcrum for said lever at diverse distances from the point of application of force thereto by said member.

9. In a motor vehicle transmission having a plurality of speed ratio controlling devices, fluid pressure operated means for selectively operating said devices, pump means for supplying fluid under pressure to said fluid pressure operated means, said pump means including a member having a plurality of cylinders, a pumping piston reciprocating in each of said cylinders, a wabble plate structure controlling movement of said pistons, control mechanism for said wabble plate structure including a member adapted for movement in response to pressure of the fluid delivered by said cylinders, a lever acting in opposition to said member, said lever having an operable connection with said wabble plate structure, and manually operable selector means for selectively positioning said fulcrum for regulating the pressure of fluid delivered by said pump.

10. In a motor vehicle transmission having a plurality of speed ratio controlling devices, a common operating member for selectively operating said devices, means including a pump for supplying fluid operating pressure to said member, control mechanism for regulating the pressure of fluid delivered by said pump, valve means for controlling the supply of fluid pressure from said pump to said member, electrically controlled prime mover means for actuating said valve means, and means for controlling energization of said electrically controlled prime mover means, said control means being operable to cause said mechanism to vary the fluid delivery output of said pump.

11. In a motor vehicle, transmission mechanism having a plurality of speed ratio controlling devices, fluid pressure operated means for selectively operating said devices, means including variably operable pump mechanism for supplying a fluid under operating pressure to said pressure operated means, and manually operable selector actuated means for controlling the operation of said pump mechanism.

12. In a motor vehicle, transmission mechanism having a plurality of speed ratio controlling devices, fluid pressure operated means for selectively operating said devices, means including variably operable pump mechanism for supplying a fluid under operating pressure to said pressure operated means, and vehicle driver operable control means operable to selectively condition said pump mechanism for regulating the fluid delivery output thereof.

13. In a motor vehicle, a prime mover, a control for varying the operation of said prime mover, a power transmission mechanism having a plurality of speed ratio controlling devices, fluid pressure operated means for selectively operating said devices, means for supplying fluid pressure to said fluid operated means, control mechanism for said fluid supply means, said mechanism comprising means adapted for movement in response to pressure of fluid delivered by said supply means, a lever operable by said pressure movable means, variable means for providing a fulcrum for said lever at diverse distances from the point of application of force thereto by said pressure movable means, and means responsive to operation of said prime mover control for selectively positioning said fulcrum for regulating the pressure delivery of said pump.

14. In a motor vehicle, an internal combustion engine having a fuel feed control member, a power transmitting mechanism having a plurality of speed ratio controlling devices, fluid pressure operated means for selectively operating said devices, means for supplying fluid pressure to said fluid operated means, control mechanism for said fluid supply means, said mechanism comprising means adapted for movement in response to pressure of fluid delivered by said supply means, a lever operable by said pressure movable means, and variable means operable by said fuel feed control member for providing a fulcrum for said lever at diverse distances from the point of application of force thereto by said pressure movable means for regulating the pressure of fluid delivered by said supply means.

15. In a motor vehicle transmission having a plurality of speed ratio controlling devices, a common operating member for selectively operating said devices, means including a pump for supplying a fluid under operating pressure to said member, valve means operable to control the supply of said fluid from said supply means to said member, means for operating said valve means, and means controlled by said valve operating means for regulating the delivery output of said pump to said supply means.

16. In a motor vehicle transmission having a plurality of fluid pressure operated speed ratio controlling devices, means including a pump for supplying fluid under pressure for operation of said devices, valve means operable to control operation of said devices, means for operating said valve means, and means controlled by said valve operating means operable to vary the fluid displacement of said pump.

17. In a motor vehicle, transmission mechanism having a plurality of speed ratio controlling devices, fluid pressure operated means for selectively operating said devices, means including a variable operable pump for supplying a fluid under operating pressure to said pressure operated means, valve means controlling the supply of fluid to said pressure operated means, means for operating said valve means, vehicle driver control means operable to effect operation of said valve operating means, a second vehicle driver control means operable to effect operation of said valve operating means independently of the operation of said first mentioned driver control means, and means responsive to operation of one of said driver control means for varying the operation of said pump.

18. In a motor vehicle, transmission mechanism having a plurality of speed ratio controlling devices, fluid pressure operated means for selectively operating said devices, means for supplying a fluid under operating pressure to said pressure operated means, said supply means including a variably operable pump, valve means operable to control the supply of fluid from said supply means to fluid pressure operated means, a driver operable control member, means operable in response to operation of said member for actuating said valve means, and other means responsive to operation of said member for varying the operation of said pump.

19. In a power transmitting mechanism including a plurality of selectively operable fluid pressure operated speed ratio controlling devices, means including a pump for supplying a fluid under operating pressure to said devices, pressure responsive means operable to vary the operation of said pump, and means including a variable fulcrum operable to cause said pressure responsive means to vary the operation of said pump.

20. In a motor vehicle, a power transmitting mechanism including a plurality of selectively operable fluid pressure operated speed ratio controlling devices, means including a pump for supplying a fluid under operating pressure to said devices, pressure responsive means operable to vary the operation of said pump, a variable fulcrum operable to cause said pressure responsive means to vary the operation of said pump, and vehicle driver operable means operable to cause operation of said fulcrum.

21. In a motor vehicle, a prime mover, a control operable to increase and decrease respectively the torque output of said prime mover, a power transmitting mechanism including a fluid pressure operated speed ratio controlling device, a pump for supplying a fluid for operation of said device, a drive for said pump, and mechanism operable in response to operation of said control to vary the fluid displacement of said pump.

22. In a motor vehicle, power transmitting mechanism including a plurality of fluid pressure operated speed ratio controlling devices, means including variably operable pump mechanism for supplying a fluid for operation of said devices, and vehicle driver operated control means operable to selectively condition said pump mechanism for varying the fluid displacement thereof.

23. In a motor vehicle, power transmitting mechanism including a plurality of fluid pressure operated speed ratio controlling devices, means inclding a pump for supplying a fluid for operation of said devices, a drive for said pump, mechanism operable to vary the fluid displacement of said pump, and a vehicle driver operated control member movable through predetermined limits of travel operable to cause said mechanism to progressively vary the fluid displacement of said pump as said member is moved through said limits of travel.

24. In a motor vehicle transmission including a fluid pressure operated speed ratio controlling device, means including a variably operable pump for supplying a fluid under pressure for operation of said device, valve means operable to control the supply of fluid from said supply means to said device, means operable to effect operation of said valve means, and means controlled by said valve operating means for varying the fluid displacement of said pump.

25. In a vehicle driving system, an engine having a throttle control element movable from a throttle closing position to a throttle opening position, a driving member, a member adapted to be driven by said driving member, a fluid pressure operated device for controlling the drive between said members, means including a pump for supplying a fluid under operating pressure to said device, drive means for said pump, and means other than said pump drive means operably associated with said throttle control member and operable to progressively increase the fluid displacement of said pump in response to movement of said element from said closing position to said opening position.

CARL A. NERACHER.